(12) United States Patent
McDaniel et al.

(10) Patent No.: US 7,919,183 B2
(45) Date of Patent: Apr. 5, 2011

(54) PARTICLES FOR USE AS PROPPANTS OR IN GRAVEL PACKS, METHODS FOR MAKING AND USING THE SAME

(75) Inventors: Robert R. McDaniel, Houston, TX (US); Avis Lloyd McCrary, Montgomery, TX (US)

(73) Assignee: Momentive Specialty Chemicals Inc., Columus, OH (US)

( * ) Notice: Subject to any disclaimer, the term of this patent is extended or adjusted under 35 U.S.C. 154(b) by 1448 days.

(21) Appl. No.: 11/230,693

(22) Filed: Sep. 20, 2005

(65) Prior Publication Data

US 2006/0078682 A1  Apr. 13, 2006

Related U.S. Application Data

(60) Provisional application No. 60/611,350, filed on Sep. 20, 2004.

(51) Int. Cl.
*B32B 5/16* (2006.01)

(52) U.S. Cl. ........ 428/402; 428/403; 428/404; 428/405; 428/406; 428/407; 166/295

(58) Field of Classification Search .......... 428/402–407; 427/212; 166/295
See application file for complete search history.

(56) References Cited

U.S. PATENT DOCUMENTS

| | | | | |
|---|---|---|---|---|
| 6,335,097 | B1 * | 1/2002 | Otsuka et al. | 428/407 |
| 6,406,789 | B1 * | 6/2002 | McDaniel et al. | 428/402 |
| 6,582,819 | B2 * | 6/2003 | McDaniel et al. | 428/402 |
| 6,632,527 | B1 * | 10/2003 | McDaniel et al. | 428/402 |

FOREIGN PATENT DOCUMENTS

EP  0972628  *  1/2000

* cited by examiner

*Primary Examiner* — Leszek Kiliman

(57) ABSTRACT

Disclosed herein is a coated particle comprising a substrate comprising an inorganic material, wherein the inorganic material comprises silica and alumina in a silica to alumina weight ratio of about 2.2 to about 5; and wherein the inorganic material has a bulk density of less than or equal to about 1 g/cm$^3$; and a coating disposed upon the substrate. Disclosed herein too is a method of treating a subterranean formation comprising injecting a fracturing fluid into the subterranean formation; wherein the fracturing fluid comprises an inorganic particle that comprises silica and alumina in a silica to alumina weight ratio of about 2.2 to about 5; and wherein the inorganic particle has a bulk density of less than or equal to about 1 g/cm$^3$.

28 Claims, 4 Drawing Sheets

PARTICLES FOR USE AS PROPPANTS OR IN GRAVEL PACKS, METHODS FOR MAKING AND USING THE SAME

CROSS REFERENCE TO RELATED APPLICATIONS

This application claims the benefit of U.S. Provisional Application Ser. No. 60/611,350 filed Sep. 20, 2004, the entire contents of which are hereby incorporated by reference.

BACKGROUND

The disclosure relates to coated particles and to methods for making and using the same. In particular, this disclosure relates to coated particles that are used as proppants or in gravel packs.

Coated and/or uncoated particles are often used as proppants to keep open fractures imposed by hydraulic fracturing upon a subterranean formation, e.g., an oil or gas bearing strata. Proppants are generally used to increase production of oil and/or gas by providing a conductive channel in the formation. Fracturing of the subterranean formation is conducted to increase oil and/or gas production. Fracturing is caused by injecting a viscous fracturing fluid or a foam at a high pressure (hereinafter injection pressure) into the well to form a fracture. As the fracture is formed, a particulate material, referred to as a "propping agent" or "proppant" is placed in the formation to maintain the fracture in a propped condition when the injection pressure is released. As the fracture forms, the proppants are carried into the fracture by suspending them in additional fluid or foam to fill the fracture with a slurry of proppant in the fluid or foam. Upon release of the pressure, the proppants form a pack that serves to hold open the fractures. The propped fracture thus provides a highly conductive channel in the formation. The degree of stimulation afforded by the hydraulic fracture treatment is largely dependent upon formation parameters, the fracture's permeability and the fracture's propped width.

Coated and/or uncoated particles can also be used as gravel packs. An example of a well completion operation using a treating fluid that contains coated particulates is gravel packing. Gravel packing treatments are used to reduce the migration of unconsolidated formation sands into the well bore. In gravel packing operations, the particles suspended in a carrier fluid are pumped into a well bore in which the gravel pack is to be placed. The carrier fluid leaks off into the subterranean zone and/or is returned to the surface while the particles are left in the subterranean zone. The resultant gravel pack acts as a filter to separate formation sands from produced fluids while permitting the produced oil and/or gas to flow into the well bore.

Gravel pack operations generally involve placing a gravel pack screen in the well bore and packing the surrounding annulus between the screen and the well bore with the particles. The gravel pack screen is generally a type of filter assembly used to support and retain the particles placed during the gravel pack operation. A wide range of sizes and screen configurations are available to suit the characteristics of a particular well bore, the production fluid, and the subterranean formation sands. Such gravel packs may be used to stabilize the formation while causing minimal impairment to well productivity. The particles act to prevent formation sands from plugging the screen or migrating with the produced fluids, and the screen acts to prevent fines from being produced to the surface and out of the well.

In some situations the processes of hydraulic fracturing and gravel packing are combined into a single treatment to provide stimulated production and an annular gravel pack to reduce formation sand production. Such treatments are often referred to as "frac pack" operations. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

Particles that are used to prop fractures or in gravel packs generally comprise sand or sintered ceramic particles. The advantage of sand is that it is cheap. Its disadvantages are its relatively low strength (high crush values) and lower flow capacities than sintered ceramic particles. Sintered ceramic particles are also used as proppants or in gravel packs. The ceramic particles are disadvantageous in that the sintering is carried out at high temperatures, resulting in high energy costs. In addition, expensive raw materials are used. They have relatively high bulk densities of greater than 2 grams per cubic centimeter ($g/cm^3$), and have abrasive properties that cause high wear in the pumps and lines used to introduce them into the drill hole.

It is therefore desirable to develop particles that can be used for hydraulic fracturing and/or gravel packs and are cost effective, have a density of less than 2 $g/cm^3$, reduce the formation of fines, and can be easily manufactured.

SUMMARY

Disclosed herein is a coated particle comprising a substrate comprising an inorganic material, wherein the inorganic material comprises silica and alumina in a silica to alumina weight ratio of about 2.2 to about 5; and wherein the inorganic material has a bulk density of less than or equal to about 1 $g/cm^3$; and a coating disposed upon the substrate.

Disclosed herein too is a coated particle comprising an inorganic substrate, wherein the inorganic substrate comprises silica and alumina in a silica to alumina weight ratio of about 2.2 to about 5; and wherein the inorganic material has a bulk density of less than or equal to about 1 $g/cm^3$; and an organic coating disposed upon the substrate.

Disclosed herein too is a coated particle comprising an inorganic substrate; and an organic coating disposed thereon; wherein the coated particle has an apparent density of about 1 to about 2 $g/cm^3$ and a bulk density of less than or equal to about 1.0 $g/cm^3$.

Disclosed herein too is an inorganic particle comprising silica and alumina, wherein the weight ratio of silica to alumina is about 2.2 to about 5, and wherein the bulk density of the inorganic particle is less than or equal to about 1 $g/cm^3$, and further wherein the particle is used as a proppant or in a gravel pack.

Disclosed herein too is a particle comprising a composite substrate comprising a polymer and a filler; wherein the filler comprises silica and alumina in a silica to alumina weight ratio of about 2.2 to about 5; and wherein the inorganic substrate has a bulk density of less than or equal to about 1 $g/cm^3$.

Disclosed herein too is a coated particle comprising an organic substrate; wherein the organic substrate comprises a naturally occurring organic material; and an organic coating disposed upon the organic substrate; wherein the organic coating comprises an inorganic filler; wherein the inorganic filler comprises silica and alumina in a silica to alumina weight ratio of about 2.2 to about 5; and wherein the inorganic substrate has a bulk density of less than or equal to about 1 g/cm$^3$.

Disclosed herein too is a method of manufacturing a coated particle comprising mixing a thermoplastic polymer, a thermosetting polymer or a thermosetting polymer precursor with an inorganic substrate to form a mixture; wherein the inorganic substrate comprises silica and alumina in a silica to alumina weight ratio of about 2.2 to about 5; and wherein the inorganic substrate has a bulk density of less than or equal to about 1 g/cm$^3$; and coating the inorganic substrate with the thermoplastic polymer, the thermosetting polymer or the thermosetting polymer precursor.

Disclosed herein too is a method of treating a subterranean formation comprising injecting a fracturing fluid into the subterranean formation; wherein the fracturing fluid comprises an inorganic particle that comprises silica and alumina in a silica to alumina weight ratio of about 2.2 to about 5; and wherein the inorganic particle has a bulk density of less than or equal to about 1 g/cm$^3$.

Disclosed herein too is a method of forming a gravel pack comprising suspending particles in a carrier fluid to form a suspension; wherein the particles comprise an inorganic substrate that comprises a first metal oxide and a second metal oxide, wherein the first metal oxide and the second metal oxide are present in a weight ratio effective to impart a bulk density of less than or equal to about 1 g/cm$^3$ and an apparent density of less than or equal to about 2 g/cm$^3$ to the particles; pumping the suspension into a well bore; and draining the carrier fluid to form a gravel pack.

Disclosed herein too is a coated particle comprising a substrate, wherein the substrate comprises a first inorganic oxide and a second inorganic oxide in a weight ratio effective to impart to the coated particle a bulk density of less than or equal to about 1 g/cm$^3$ and an apparent density of less than or equal to about 2 g/cm$^3$; and an organic coating disposed upon the substrate.

DETAILED DESCRIPTION

Figure 1:
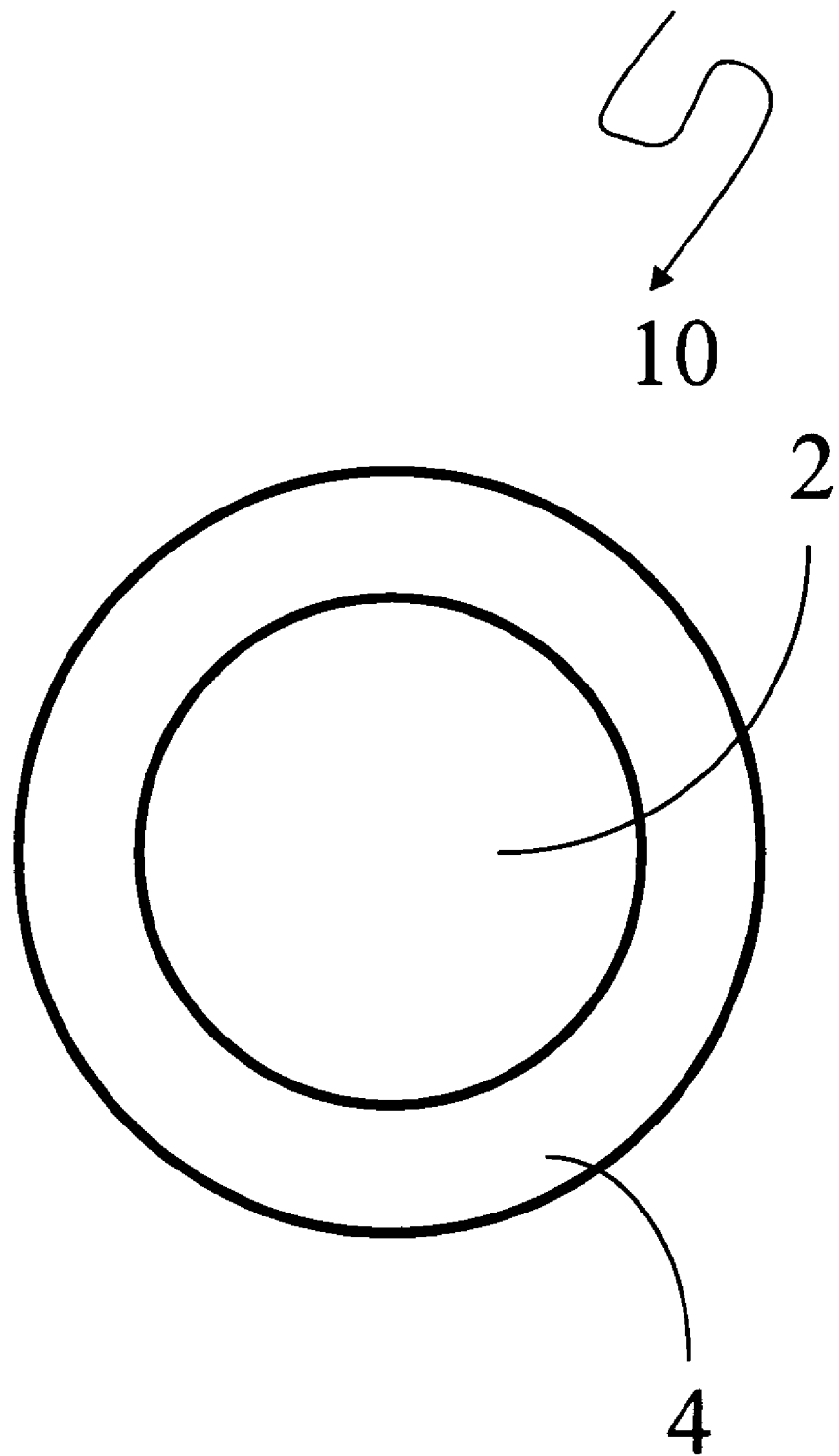
FIG. 1 depicts one exemplary embodiment of a coated particle comprising a solid inorganic substrate upon which is disposed an organic coating.

It is to be noted that as used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

Disclosed herein are particles that may be used as proppants as well as in gravel packs for improving oil and/or gas production from subterranean formations. In one embodiment, the particles are "coated particles" and comprise inorganic substrates upon which are disposed an organic coating that comprises an organic and/or inorganic filler. In another embodiment, the coated particles comprise organic substrates upon which are disposed an organic coating comprising inorganic fillers or a combination of organic fillers with inorganic fillers. In yet another embodiment, the inorganic substrates are not coated with an organic coating and may be employed in this "as received condition" as proppants or in gravel packs. The substrates that are not coated will hereinafter be referred to as uncoated particles. The organic coating that is disposed upon the substrate can be fully cured, partially cured or uncured prior to its use as a proppant or in a gravel pack. The organic coating can also comprise a thermoplastic polymer.

The coated and uncoated particles described herein are advantageous for use in proppants or gravel packs since the inorganic substrates are porous and have apparent densities of less than or equal to about 2.0 g/cm$^3$ and display a crush test percentage of about 1 to about 40%. The crush test percentage, the porosity and hence the density of the substrates can be advantageously tuned to a desired value by subjecting the substrates to selected heat treatment conditions. The inorganic substrate can be formulated to have varying degrees of open and/or closed porosity. The degree of porosity and whether it is opened or closed directly impacts final particle apparent density. The inorganic substrates are advantageous in that their low density facilitates the production of coated and uncoated particles that have a correspondingly low density. The low density of the coated or uncoated particles allows them to be used as proppants and to be transported further with lower pump rates. Their roundness and sphericity also make them highly conductive at lower closure stresses of less than or equal to about 2000 psi.

In one embodiment, the coated and uncoated particles comprise substrates comprising inorganic oxides and/or metal oxides. In another embodiment, the coated particles comprise a first metal oxide and a second metal oxide, wherein the weight ratio of the first metal oxide to the second metal oxide is effective to impart to the coated particle a bulk density of less than or equal to about 1 g/cm$^3$ and an apparent density of less than or equal to about 2 g/cm$^3$. In yet another embodiment, the first metal oxide is silica, while the second metal oxide is alumina.

Figure 2:
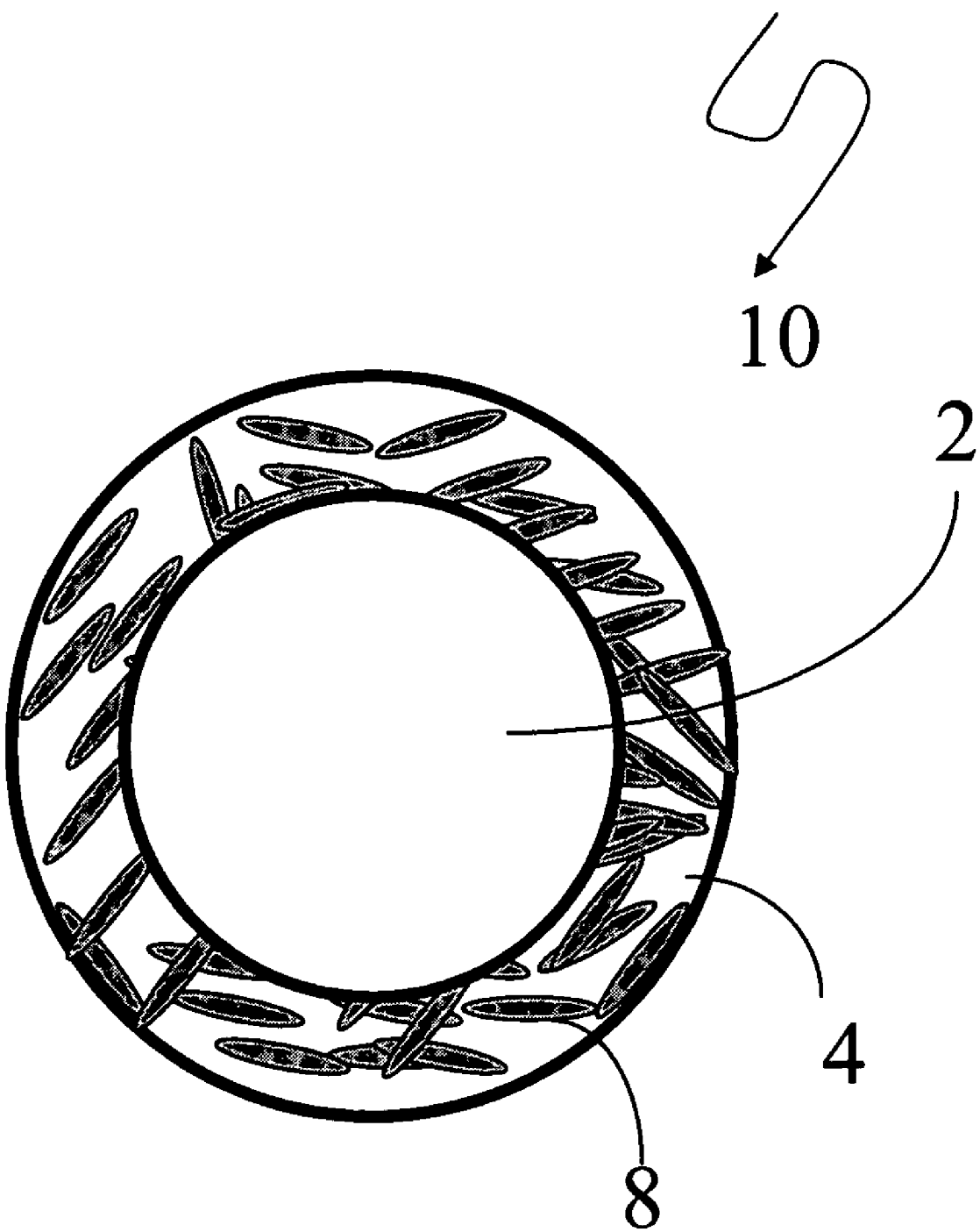
FIG. 2 depicts another exemplary embodiment of a coated particle comprising a solid inorganic substrate upon which is disposed an organic coating that comprises a filler.

With reference now to the FIG. 1, one exemplary embodiment of the coated particle 10 comprises a substrate 2 upon which is disposed an organic coating 4. The substrate can comprise an organic material and/or an inorganic material. The organic coating 4 can be a thermoplastic polymer, an uncured, partially cured or fully cured thermosetting polymer prior to use in a subterranean fracture. The organic coating 4 can optionally comprise particulate fillers or fibrous fillers 8 if desired as depicted in the FIG. 2. This curing can occur either inside and/or outside the subterranean fracture.

The organic material used in the substrate can be naturally occurring or synthetically produced. Similarly, organic fillers contained in the organic coating can also be naturally occurring or synthetically produced. The term "naturally occurring" as defined herein refers to materials that are present in nature such as, for example, those that grow on trees or animals and which can be used in the proppants without any substantial change in their chemistry. The naturally occurring materials can, however, be subjected to processes which change their physical dimensions such as grinding, crushing, size based separations, or the like. An example of a naturally occurring organic material is a crushed fruit seed. A naturally occurring material that has a partial change in its chemistry as a result of processing is still considered a naturally occurring material for purposes of this application. For example, a crushed fruit seed that has been coated with a silane coupling agent will be considered a naturally occurring material for purposes of this application. Synthetically produced organic materials are those that have undergone a complete change in chemistry during processing. For example, polymers such as polyethylene, polyester, or the like, can be considered to be synthetically produced organic materials.

Figure 3:
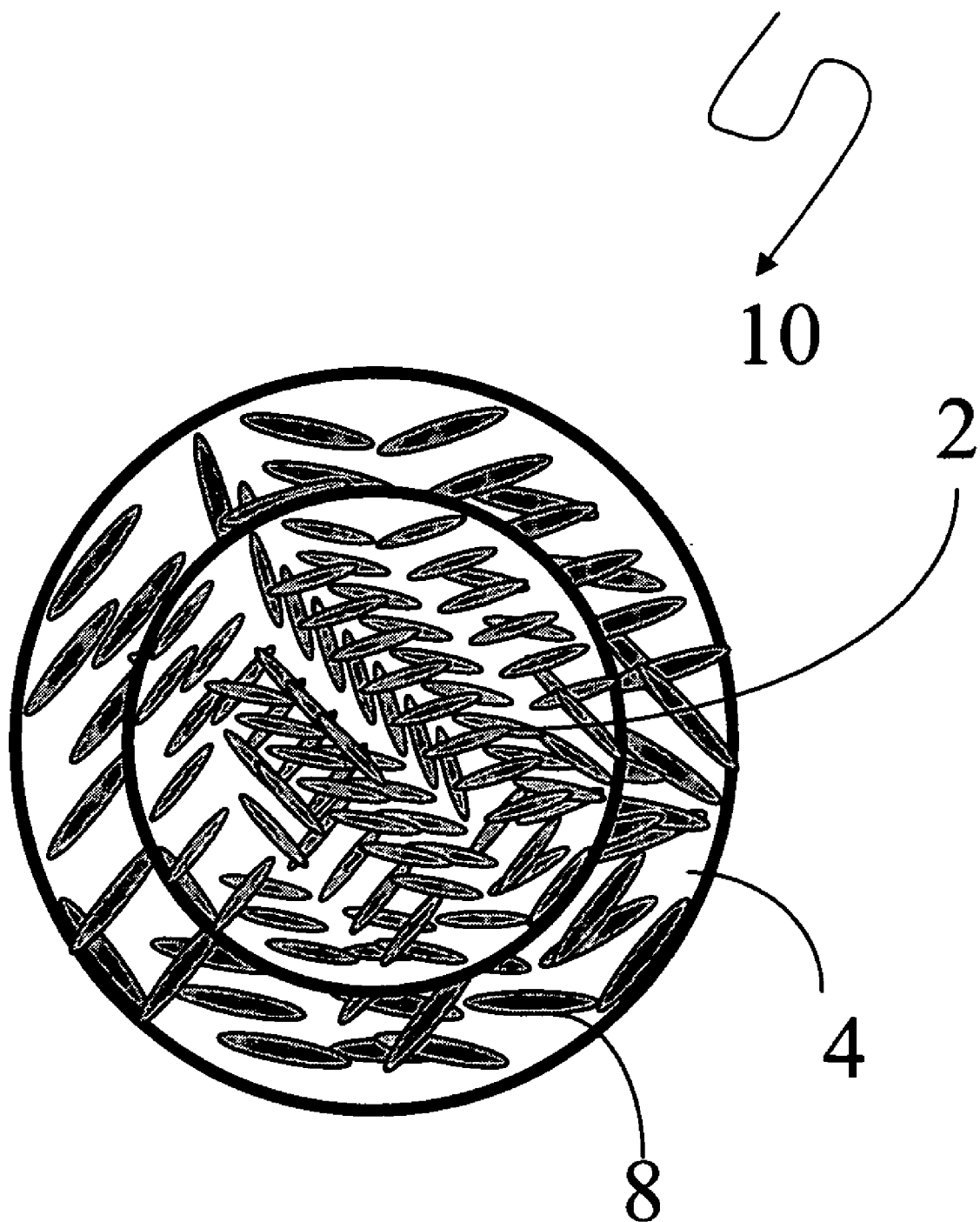
FIG. 3 depicts another exemplary embodiment of a coated particle that comprises an organic substrate with an organic coating disposed thereon; both the substrate and the coating have inorganic and/or organic fillers disposed therein.

In another exemplary embodiment, shown in the FIG. 3, the coated particle 10 comprises an organic substrate 2 that comprises fillers. Such a substrate will hereinafter be referred to as a "composite substrate". Disposed upon this composite substrate 2 is an optional organic coating 4 that can optionally comprise particulate fillers or fibrous fillers 8. The fillers can comprise an inorganic and/or a naturally occurring organic material.

With reference once again to the FIGS. 1 and 2, the coated particle 10 comprises an inorganic and/or an organic substrate 2. In one embodiment, the substrate 2 generally comprises a single inorganic particle. In another embodiment depicted in the FIG. 4, the inorganic substrate is an agglomerate comprising a plurality of inorganic particles. In yet another embodiment, the coated particle can comprise an organic substrate, while the organic coating can comprise an inorganic filler. It is desirable for the inorganic substrate or the inorganic filler to have a silica to alumina ratio of about 2.2 to about 5, while having a bulk density of less than or equal to about 1 g/cm$^3$.

Examples of inorganic materials that can be used in the substrate are inorganic oxides, inorganic carbides, inorganic nitrides, inorganic hydroxides, inorganic oxides having hydroxide coatings, inorganic carbonitrides, inorganic oxynitrides, inorganic borides, inorganic borocarbides, or the like, or a combination comprising at least one of the foregoing inorganic materials. Examples of suitable inorganic materials are metal oxides, metal carbides, metal nitrides, metal hydroxides, metal oxides having hydroxide coatings, metal carbonitrides, metal oxynitrides, metal borides, metal borocarbides, or the like, or a combination comprising at least one of the foregoing inorganic materials. Metallic cations used in the foregoing inorganic materials can be from transition metals, alkali metals, alkaline earth metals, rare earth metals, or the like, or a combination comprising at least one of the foregoing metals.

Examples of suitable inorganic oxides include silica ($SiO_2$), alumina ($Al_2O_3$), titania ($TiO_2$), zirconia ($ZrO_2$), ceria ($CeO_2$), manganese oxide ($MnO_2$), zinc oxide (ZnO), iron oxides (e.g., FeO, $\alpha$-$Fe_2O_3$, $\gamma$-$Fe_2O_3$, $Fe_3O_4$, or the like), calcium oxide (CaO), manganese dioxide ($MnO_2$ and $Mn_3O_4$), or a combination comprising at least one of the foregoing inorganic oxides. Examples of suitable inorganic carbides include silicon carbide (SiC), titanium carbide (TiC), tantalum carbide (TaC), tungsten carbide (WC), hafnium carbide (HfC), or the like, or a combination comprising at least one of the foregoing carbides. Examples of suitable nitrides include silicon nitrides ($Si_3N_4$), titanium nitride (TiN), or the like, or a combination comprising at least one of the foregoing. Examples of suitable borides are lanthanum boride ($LaB_6$), chromium borides (CrB and $CrB_2$), molybdenum borides ($MoB_2$, $Mo_2B_5$ and MoB), tungsten boride ($W_2B_5$), or the like, or a combination comprising at least one of the foregoing borides. Exemplary inorganic substrates are those that comprise silica and/or alumina.

Other examples of suitable inorganic materials that can be used in the substrate are silica (sand), aeschynite (rare earth yttrium titanium niobium oxide hydroxide), anatase (titanium oxide), bindheimite (lead antimony oxide hydroxide), bixbyite (manganese iron oxide), brookite (titanium oxide), chrysoberyl (beryllium aluminum oxide), columbite (iron manganese niobium tantalum oxide), corundum (aluminum oxide), cuprite (copper oxide), euxenite (rare earth yttrium niobium tantalum titanium oxide), fergusonite (rare earth iron titanium oxide), hausmannite (manganese oxide), hematite (iron oxide), ilmenite (iron titanium oxide), perovskite (calcium titanium oxide), periclase (magnesium oxide), polycrase (rare earth yttrium titanium niobium tantalum oxide), pseudobrookite (iron titanium oxide), members of the pyrochlore group such as, for example, betafite (rare earths calcium sodium uranium titanium niobium tantalum oxide hydroxide), microlite (calcium sodium tantalum oxide hydroxide fluoride), pyrochlore (sodium calcium niobium oxide hydroxide fluoride), or the like, or a combination comprising at least one of the foregoing pyrochlore group members; ramsdellite (manganese oxide), romanechite (hydrated barium manganese oxide), members of the rutile group, such as, for example, cassiterite (tin oxide), plattnerite (lead oxide), pyrolusite (manganese oxide), rutile (titanium oxide), stishovite (silicon oxide), or the like, or a combination comprising at least one of the foregoing rutile group members; samarskite-(Y) (rare earth yttrium iron titanium oxide), senarmontite (antimony oxide), members of the spinel group such as chromite (iron chromium oxide), franklinite (zinc manganese iron oxide), gahnite (zinc aluminum oxide), magnesiochromite (magnesium chromium oxide), magnetite (iron oxide), and spinel (magnesium aluminum oxide), or the like, or a combination comprising at least one of the foregoing spinel group members; taaffeite (beryllium magnesium aluminum oxide), tantalite (iron manganese tantalum niobium oxide), tapiolite (iron manganese tantalum niobium oxide), uraninite (uranium oxide), valentinite (antimony oxide), zincite (zinc manganese oxide), hydroxides, such as, for example, brucite (magnesium hydroxide), gibbsite (aluminum hydroxide), goethite (iron oxide hydroxide), limonite (hydrated iron oxide hydroxide), manganite (manganese oxide hydroxide), psilomelane (barium manganese oxide hydroxide), romeite (calcium sodium iron manganese antimony titanium oxide hydroxide), stetefeldtite (silver antimony oxide hydroxide), stibiconite (antimony oxide hydroxide), or the like, or a combination comprising at least one of the foregoing inorganic materials.

Organic and inorganic materials that are subsequently modified can also be used as the substrate. Suitable examples of organic and inorganic materials that are modified an used in the substrate are exfoliated clays (e.g., expanded vermiculite), exfoliated graphite, blown glass or silica, hollow glass spheres, foamed glass spheres, cenospheres, foamed slag, sintered bauxite, sintered alumina, or the like, or a combination comprising one of the foregoing organic and inorganic materials. Exemplary inorganic substrates may be derived from sand, milled glass beads, sintered bauxite, sintered alumina, mineral fibers such as zircon and mullite, or the like, or a combination comprising one of the inorganic substrates. Hollow glass spheres can be commercially obtained from Diversified Proppants.

In one exemplary embodiment, when the substrate of the coated particle comprises a single particle, an exemplary synthetically produced, inorganic substrate comprises silica ($SiO_2$), alumina ($Al_2O_3$), titanium dioxide ($TiO_2$), ferric oxide ($Fe_2O_3$), calcium oxide (CaO), magnesium oxide (MgO), potassium dioxide ($K_2O$) and sodium oxide ($Na_2O$). The inorganic substrate can also comprise sulfite ions, chloride ions, water, and carbon dioxide in trace amounts of less than or equal to about 2 wt %, based on the weight of the substrate. The substrate can comprise the aforementioned ingredients as shown in the Table 1 below. Table 1 shows the amount of the ingredients in weight percents (wt %), based on the weight of the substrate. The ranges indicate the amount of each ingredient that can be present in the substrate.

TABLE 1

| Ingredient | 1$^{st}$ Range | 2$^{nd}$ Range | Exemplary amount |
|---|---|---|---|
| Silica (SiO$_2$) | about 55 to about 75 wt % | about 62 to about 66 wt % | 64.8 wt % |
| Alumina (Al$_2$O$_3$) | about 15 to about 25 wt % | about 17 to about 19 wt % | 18.1 wt % |
| Titanium dioxide (TiO$_2$) | about 0.5 to about 1.5 wt % | about 0.6 to about 1 wt % | 0.84 wt % |
| Ferric Oxide (Fe$_2$O$_3$) | about 5.5 to about 8.0 wt % | about 6.0 to about 7.5 wt % | 6.9 wt % |
| Calcium Oxide (CaO) | about 1.0 to about 3.0 wt % | about 1.2 to about 2.0 wt % | 1.4 wt % |
| Magnesium Oxide (MgO) | about 1.0 to about 3.0 wt % | about 1.5 to about 2.5 wt % | 2 wt % |
| Potassium Oxide (K$_2$O) | about 2.5 to about 4.0 wt % | about 2.9 to about 3.5 wt % | 3.1 wt % |
| Sodium Oxide (Na$_2$O) | about 0.1 to about 1.0 wt % | about 0.2 to about 0.6 wt % | 0.35 wt % |

As can be seen from the Table 1, the weight ratio of silica to alumina varies in an amount of about 2.2 to about 5. In one embodiment, the weight ratio of silica to alumina is about 3 to about 4. An exemplary weight ratio of silica to alumina is 3.58. The weight ratio of silica to ferric oxide is about 6.8 to about 13.0. An exemplary weight ratio of silica to ferric oxide is 9.4. The weight ratio of alumina to ferric oxide is about 2 to about 5. An exemplary weight ratio of alumina to ferric oxide is about 2.6.

In another exemplary embodiment, the inorganic substrate. has a bulk density of about 0.6 to about 1.0 g/cm$^3$ and an apparent density of about 1.3 to about 2.0 g/cm$^3$. The inorganic substrates display a crush test percentage of less than or equal to about 20% when subjected to a crush test as per API RP 60. The inorganic substrate has a roundness of about 0.6 to about 0.9 and a sphericity of about 0.6 to about 0.9. The inorganic substrate can comprise closed pores or open pores or a combination of opened and closed. The pores in the inorganic substrate are generated upon subjecting the inorganic substrate to heat.

In one embodiment, when the inorganic substrates are heat treated to a temperature of 850° C. (prior to disposing the organic coating on the substrates), most of the pores are open, i.e., there is interconnectivity between the pores. At temperatures of about 850 to about 925° C., some of the pores are open while some are closed, while at temperatures of greater than or equal to about 925° C. the pores are closed. Thus depending upon the heat treatment, the type or pores and accordingly the density of the inorganic substrate can be varied.

As noted above, the substrate can also comprise organic materials that are naturally occurring or synthetically produced. Naturally occurring organic substrates are ground or crushed nut shells, ground or crushed seed shells, ground or crushed fruit pits, processed wood, ground or crushed animal bones, or the like, or a combination comprising at least one of the naturally occurring fillers. Examples of suitable ground or crushed shells are shells of nuts such as walnut, pecan, almond, ivory nut, brazil nut, ground nut (peanuts), pine nut, cashew nut, sunflower seed, Filbert nuts (hazel nuts), macadamia nuts, soy nuts, pistachio nuts, pumpkin seed, or the like, or a combination comprising at least one of the foregoing nuts. Examples of suitable ground or crushed seed shells (including fruit pits) are seeds of fruits such as plum, peach, cherry, apricot, olive, mango, jackfruit, guava, custard apples, pomegranates, watermelon, ground or crushed seed shells of other plants such as maize (e.g., corn cobs or corn kernels), wheat, rice, jowar, or the like, or a combination comprising one of the foregoing processed wood materials such as, for example, those derived from woods such as oak, hickory, walnut, poplar, mahogany, including such woods that have been processed by grinding, chipping, or other form of particalization. An exemplary naturally occurring organic substrate is a ground olive pit.

Synthetically produced organic substrates can comprise thermoplastic polymers, thermosetting polymers, or a combination comprising a thermosetting polymer and a thermoplastic polymer. Examples of suitable organic materials that can be used as the substrate are polymer precursors (e.g., low molecular weight species such as monomers, dimers, trimers, or the like), oligomers, polymers, copolymers such as block copolymers, star block copolymers, terpolymers, random copolymers, alternating copolymers, graft copolymers, or the like; dendrimers, ionomers, or the like, or a combination comprising at least one of the foregoing. When the substrate comprises a thermosetting polymer, it is desirable for the organic materials to undergo curing (crosslinking) upon the application of either thermal energy, electromagnetic radiation, or a combination comprising at least one of the foregoing. Initiators may be used to induce the curing. Other additives that promote or control curing such as accelerators, inhibitors, or the like, can also be used.

Examples of suitable thermosetting polymers for use in the substrate are epoxies, acrylate resins, methacrylate resins, phenol-formaldehydes, epoxy-modified novolacs, furans, urea-aldehydes, melamine-aldehydes, polyester resins, alkyd resins, phenol formaldehyde novolacs, phenol formaldehyde resoles, phenol-aldehydes, resole and novolac resins, epoxy modified phenolics, polyacetals, polysiloxanes, polyurethanes, or the like, or a combination comprising at least one of the foregoing thermosetting polymers.

Epoxy-modified novolacs are disclosed by U.S. Pat. No. 4,923,714 to Gibb et al. incorporated herein by reference. The phenolic portion can comprise a phenolic novolac polymer; a phenolic resole polymer; a combination of a phenolic novolac polymer and a phenolic resole polymer; a cured combination of phenolic/furan or a furan resin to form a precured resin (as disclosed by U.S. Pat. No. 4,694,905 to Armbruster incorporated herein by reference); or a curable furan/phenolic resin system curable in the presence of a strong acid to form a curable resin (as disclosed by U.S. Pat. No. 4,785,884 to Armbruster). The phenolics of the above-mentioned novolac or resole polymers may be phenol moieties or bis-phenol moieties.

The thermosetting polymers can be cold setting resins. Cold setting resins are those that can react at room temperature without the use of additional heat. Cold setting resins generally cure at a temperature of less than or equal to about 65° C. Thus, for example, a thermoset that cures at 80° C. is not a cold setting resin. Examples of suitable cold setting resins include epoxies cured with an amine when used alone or with a polyurethane, polyurethanes, alkaline modified resoles set by esters (e.g., ALPHASET® and BETASET®), furans, e.g., furturyl alcohol-formaldehyde, urea-formaldehyde, and free methylol-containing melamines set with acid. For the purposes of this description, a cold set resin is any resin that can normally be cured at room temperature. ALPHASET® and BETASET® resins are ester cured phenolics.

Urethanes are disclosed by U.S. Pat. No. 5,733,952 to Geoffrey. Melamine resins are disclosed by U.S. Pat. Nos.

5,952,440, 5,916,966, and 5,296,584 to Walisser. ALPHASET resins are disclosed by U.S. Pat. No. 4,426,467 and Re. 32,812 (which is a reissue of U.S. Pat. No. 4,474,904) all of which are incorporated herein by reference.

Modified resoles are disclosed by U.S. Pat. No. 5,218,038, incorporated herein by reference in its entirety. Such modified resoles are prepared by reacting an aldehyde with a blend of unsubstituted phenols wherein at least one phenol is selected from the group consisting of arylphenol, alkylphenol, alkoxyphenol, and aryloxyphenol. Modified resoles include alkoxy modified resoles. An exemplary alkoxy modified resole is a methoxy modified resole. An exemplary phenolic resole is a modified orthobenzylic ether-containing resole prepared by the reaction of a phenol and an aldehyde in the presence of an aliphatic hydroxy compound containing two or more hydroxy groups per molecule. In one exemplary modification of the process, the reaction is also carried out in the presence of a monohydric alcohol.

Examples of suitable thermoplastic polymers that can be used in the substrate are polyolefins, polyacrylics, polycarbonates, polyalkyds, polystyrenes, polyesters, polyamides, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, phenolics, epoxies, or a combination comprising at least one of the foregoing thermoplastic polymers.

The substrates can have any desired shape such as spherical, egg shaped, cubical, polygonal, or the like. It is generally desirable for the substrates to be spherical in shape. Substrates can be porous or non-porous. The substrates can have average particle sizes of about 100 micrometers to about 1,400 micrometers (about 140 mesh to about 14 mesh). In one embodiment, the substrates can have average particle sizes of about 300 micrometers to about 600 micrometers. In another embodiment, the substrates can have average particle sizes of about 400 micrometers to about 500 micrometers.

Figure 4:
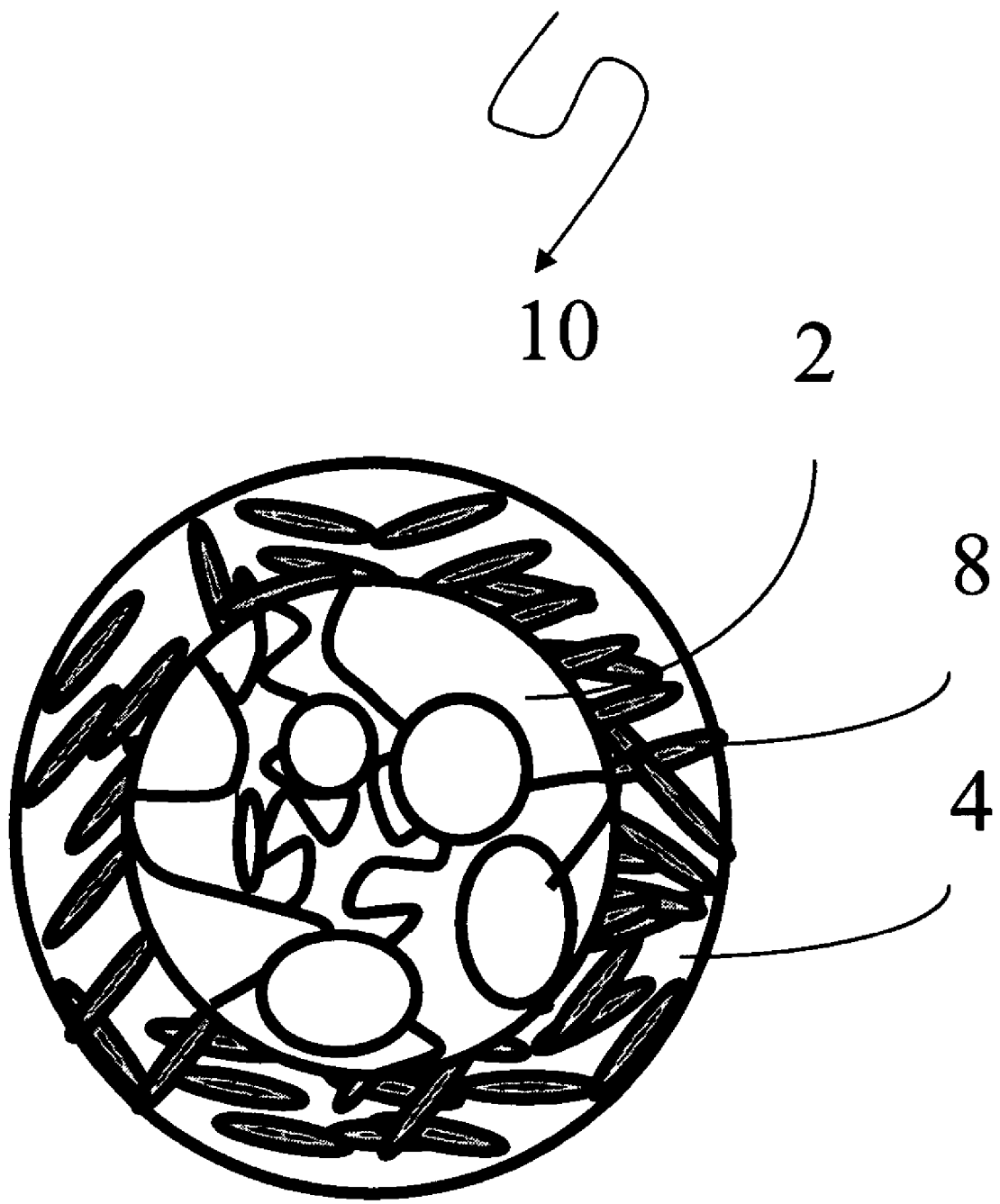
FIG. 4 depicts another exemplary embodiment of a coated particle that comprises an inorganic substrate, wherein the substrate comprises agglomerates of inorganic particles.

As noted above, the substrate 2 generally comprises a single inorganic particle or is an agglomerate comprising a plurality of inorganic particles. FIG. 4 exemplifies one such embodiment, where the substrate comprises a single particle that is formed from multiple particles that are agglomerated together. In agglomerating together, the particles form pores between them, which reduce the density of the substrate. In such a case, the individual particles that combine to form the substrate can have average particle sizes of about 2 to about 30 micrometers. In one embodiment, the particles that agglomerate to form the substrate may have average particle sizes of less than or equal to about 28 micrometers. In another embodiment, the particles that agglomerate to form the substrate may have average particle sizes of less than or equal to about 25 micrometers. In yet another embodiment, the particles that agglomerate to form the substrate may have average particle sizes of less than or equal to about 20 micrometers. In yet another embodiment, the particles that agglomerate to form the substrate may have average particle sizes of less than or equal to about 15 micrometers. Bimodal or higher particle size distributions may be used. The pores can be open pores or closed pores.

The density of the substrate can be chosen depending upon the application for which the proppant is being used. It is desirable to choose substrates that can impart to the proppant an apparent density of 1 to 4 $g/cm^3$. The apparent density is defined as the density of the entire proppant (i.e., the weight per unit volume of the entire material including voids inherent in the proppant). In one embodiment, the substrate has an apparent density of about 1.4 to about 1.9 $g/cm^3$. In another embodiment, the substrate has an apparent density of about 1.5 to about 1.85 $g/cm^3$. In yet another embodiment, the substrate has an apparent density of about 1.6 to about 1.80 $g/cm^3$. An exemplary apparent density for the substrate is about 1.80 $g/cm^3$.

In one embodiment as depicted in the FIG. 3, the substrate can comprise a composite of inorganic and organic materials. Such a substrate is termed a "composite substrate". The organic materials can also be chemically bonded to the inorganic materials. Chemical bonding comprises covalent bonding, hydrogen bonding, ionic bonding, or the like. An example of a suitable reaction between an organic and an inorganic material that involves covalent bonding is a sol-gel reaction. The chemical bonding between the organic and inorganic materials can result in substrates that are nanocomposites.

When the composite substrate comprises a combination of organic and inorganic materials, the inorganic materials can be present in an amount of about 10 to about 90 weight percent (wt %), based on the total weight of the composite substrate. In one embodiment, the inorganic materials can be present in an amount of about 20 to about 80 weight percent (wt %), based on the total weight of the composite substrate. In another embodiment, the inorganic materials can be present in an amount of about 30 to about 70 weight percent (wt %), based on the total weight of the composite substrate. In yet another embodiment, the inorganic materials can be present in an amount of about 40 to about 60 weight percent (wt %), based on the total weight of the composite substrate.

As noted above, the substrate can be solid (i.e., without any substantial porosity) or porous if desired. In general, a porous substrate permits for impregnation by an organic material, thereby imparting to the substrate an ability to flex and to absorb shock and stress without deforming. The ability of a polymer to impregnate the substrate also minimizes the ability of the proppant to facture, thereby reducing dust generation. By impregnating a porous inorganic substrate with an organic material, the density of the proppant can be adjusted to suit various fracture conditions. In general, the substrate can have a porosity of greater than or equal to about 5%, based on the total volume of the substrate. In one embodiment, the substrate can have a porosity of greater than or equal to about 10%, based on the total volume of the substrate. In another embodiment, the substrate can have a porosity of greater than or equal to about 20%, based on the total volume of the substrate. In yet another embodiment, the substrate can have a porosity of greater than or equal to about 50%, based on the total volume of the substrate.

The substrates can be present in the coated particles in an amount of 10 to about 90 weight percent (wt %), based on the total weight of the coated particles. In one embodiment, the substrates are present in an amount of 20 to 80 wt %, based on the total weight of the coated particles. In another embodiment, the substrates are present in an amount of 30 to about 75 wt %, based on the total weight of the coated particles. In yet another embodiment, the substrates are present in an amount of 35 to 65 wt %, based on the total weight of the coated particles. In an exemplary embodiment, the substrate is present in an amount of about 47 wt %, based on the total weight of the coated particles.

The composite substrates can also comprise fibrous fillers. Fibrous fillers generally have an aspect ratio greater than 1. As used herein, "fibrous" fillers may therefore exist in the form of whiskers, needles, rods, tubes, strands, elongated platelets, lamellar platelets, ellipsoids, micro fibers, nanofibers and nanotubes, elongated fullerenes, and the like. Where such fillers exist in aggregate form, an aggregate having an aspect ratio greater than 1 will also suffice for the purpose of this invention. Examples of such fillers well known in the art include those described in "Plastic Additives Handbook, $5^{th}$ Edition" Hans Zweifel, Ed, Carl Hanser Verlag Publishers, Munich, 2001. Non-limiting examples of suitable fibrous fillers include short inorganic fibers, including processed mineral fibers such as those derived from blends comprising at least one of aluminum silicates, aluminum oxides, magnesium oxides, and calcium sulfate hemihydrate, boron fibers, ceramic fibers such as silicon carbide, and fibers from mixed oxides of aluminum, boron and silicon sold under the trade name NEXTEL® by 3M Co., St. Paul, Minn., USA. Also included among fibrous fillers are single crystal fibers or "whiskers" including silicon carbide, alumina, boron carbide, iron, nickel, copper. Fibrous fillers such as glass fibers, basalt fibers, including textile glass fibers and quartz may also be included.

Also included are natural organic fibers such as, for example, wood flour obtained by pulverizing wood, and fibrous products such as cellulose, cotton, sisal, jute, cloth, hemp cloth, felt, and natural cellulosic fabrics such as Kraft paper, cotton paper and glass fiber containing paper, starch, cork flour, lignin, ground nut shells, corn, rice grain husks, or the like, or a combination comprising at least one of the foregoing.

In addition, synthetic reinforcing fibers may be used in the composite substrate. This includes organic materials capable of forming fibers such as phenolic fibers, polyethylene terephthalate, polybutylene terephthalate and other polyesters, polyarylates, polyethylene, polyvinylalcohol, polytetrafluoroethylene, acrylic resins, high tenacity fibers with high thermal stability including aromatic polyamides, polyaramid fibers such as those commercially available from Du Pont de Nemours under the trade name Kevlar, polybenzimidazole, polyimide fibers such as those available from Dow Chemical Co. under the trade names POLYIMIDE 2080® and PBZ® fiber, polyphenylene sulfide, polyether ether ketone, polyimide, polybenzoxazole, aromatic polyimides or polyetherimides, and the like. Combinations of any of the foregoing fibers may also be used. Exemplary fibers are phenolic resin fibers.

In an exemplary embodiment, glass fibers can be used as the fibrous filler in the composite substrate. Useful glass fibers can be formed from any type of fiberizable glass composition and include those prepared from fiberizable glass compositions commonly known as "E-glass," "A-glass," "C-glass," "D-glass," "R-glass," "S-glass," as well as E-glass derivatives that are fluorine-free and/or boron-free. AR-glass can be used for its alkali resistance. Commercially produced glass fibers generally having nominal filament diameters of about 4.0 to about 35.0 micrometers, and most commonly produced E-glass fibers having nominal filament diameters of about 9.0 to about 30.0 micrometers may be included in the composite substrate. Use of non-round fiber cross sections are also possible. The glass fibers may be sized or unsized. Sized glass fibers can be coated on at least a portion of their surfaces with a sizing composition selected for compatibility with the coating that is disposed upon the substrate. The sizing composition facilitates wet-out and wet-through of the coating upon the fiber strands and assists in attaining desired physical properties in the composite.

The glass fibers are preferably glass strands that have been sized. In preparing the glass fibers, a number of filaments can be formed simultaneously, sized with a silane coating agent and then bundled into what is called a strand. Alternatively the strand itself may be first formed of filaments and then sized. The amount of sizing employed is generally that amount which is sufficient to bind the glass filaments into a continuous strand and ranges from about 0.1 to about 5 wt %, and more typically ranges from about 0.1 to 2 wt % based on the weight of the glass fibers. Generally, this may be about 1.0 wt % based on the weight of the glass filament. Glass fibers in the form of chopped strands about one-fourth inch long or less and preferably about one-eighth inch long may also be used. They may also be longer than about one-fourth inch in length if desired.

Fibers used in the composite substrate can have lengths of about 6 to about 3200 μm. In one embodiment, fiber lengths are about 10 to about 1600 μm. In another embodiment, fiber lengths are about 10 to about 800 μm. Exemplary fibers are shorter than the greatest diameter of the composite substrate.

Fiber diameters (or, for fibers of non-circular cross-section, a hypothetical dimension equal to the diameter of a hypothetical circle having an area equal to the cross-sectional area of the fiber) are about 1 to about 20 μm. Aspect ratio (length to diameter ratio) can be in amounts of about 5 to about 175. The fiber may have a round, oval, square, rectangular or other appropriate cross-section. The fibers may be straight, crimped, curled or a combination thereof.

An exemplary filler that is used in the organic coating is silica flour. The silica flour generally has particle sizes of less than or equal to about 20 micrometers. In one embodiment, the silica flour has particle sizes of less than or equal to about 10 micrometers. In another embodiment, the silica flour has particle sizes of less than or equal to about 5 micrometers. An example of commercially available silica flour is SIKRON® SF 242 commercially available from Quarzwerke GmbH, Frechen, Germany.

In one embodiment, the organic coating that disposed upon the substrate comprises a thermosetting polymer or a combination of a thermosetting polymer with a thermoplastic polymer. As noted above, the organic coating can comprise a thermoplastic polymer, a fully cured, partially cured or uncured thermosetting polymer prior to introduction into subterranean fracture. The organic coating can be applied in a single layer or in multiple layers if desired. It is desirable for the coating to comprise at least one layer. The coating can be applied in about 1 to about 10 layers. It is desirable to coat the substrate with 2 or more layers, 3 or more layers or 4 or more layers. The outermost layer (i.e., the layer furthest from the substrate) is generally free from filler.

In one embodiment, when multiple layers are used, the successive layers can have a chemistry that is similar to one another. In another embodiment, when multiple layers are used, each layer can have a unique chemistry i.e., a chemistry that is different from the chemistry of another layer. When multiple layers are used in the coating, at least one layer may contain suitable fillers. The layer that comprises the thermosetting polymer as well as the fillers is termed the composite layer. It is generally desirable for the composite layer to be disposed upon the substrate. The thermosetting polymers that can be used in the organic coating as well as the fillers that can be used in the coating are listed above. Examples of suitable thermoplastic polymers are provided above in the section that details the organic materials that can be used as a substrate.

As noted above, the organic coating can comprise fillers. The fillers can be organic fillers or inorganic fillers. The organic fillers can be naturally occurring fillers or synthetically manufactured and are listed above in the section detailing the inorganic and organic materials that can be used as substrates. The inorganic fillers can be highly porous and can be impregnated with suitable polymers in order to change their density.

The organic coating can optionally contain additives such as hardeners, impact modifiers, flow control additives, crosslinking agents, foaming agents, initiators, thermal stabilizers, light stabilizers, antioxidants, flame retardants, antidrip agents, antiozonants, stabilizers, anti-corrosion additives, mold release agents, fillers, anti-static agents, pigments, dyes, and the like, or combination comprising at least one of the foregoing.

As stated above, the organic coating can optionally contain an impact modifier. An impact modifier can impart elastic properties to the organic coating. Suitable impact modifiers include natural and synthetic elastomeric polymers, typically derived from such monomers as olefins (e.g., ethylene, propylene, 1-butene and 4-methyl-1-pentene), alkenylaromatic monomers (e.g., styrene and α-methylstyrene), conjugated dienes (e.g., butadiene, isoprene and chloroprene), and vinylic carboxylic acids and their derivatives (e.g., vinyl acetate, acrylic acid, alkylacrylic acids, ethyl acrylate, methyl methacrylate and acrylonitrile). They include homopolymers and random, block, radial block, graft and core-shell copolymers or a combination comprising at least one of the foregoing.

A particularly useful class of impact modifiers comprises the AB (diblock) and ABA (triblock) copolymers and core-shell graft copolymers of alkenylaromatic and diene compounds, especially those comprising styrene and either butadiene or isoprene blocks. The conjugated diene blocks may be partially or entirely hydrogenated, whereupon they may be represented as ethylene-propylene blocks and the like and have properties similar to those of olefin block copolymers. Examples of suitable triblock copolymers of this type are polystyrene-polybutadiene-polystyrene (SBS), hydrogenated polystyrene-polybutadiene-polystyrene (SEBS), polystyrene-polyisoprene-polystyrene (SIS), poly(α-methylstyrene)-polybutadiene-poly(α-methylstyrene) and poly(α-methylstyrene)-polyisoprene-poly(α-methylstyrene).
Particularly preferred triblock copolymers are available commercially as CARIFLEX®, KRATON D®, and KRATON G® from Shell.

Also suitable as impact modifiers are core-shell type graft copolymers and ionomer resins, which may be wholly or partially neutralized with metal ions. In general, the core-shell type graft copolymers have a predominantly conjugated diene or crosslinked acrylate rubbery core and one or more shells polymerized thereon and derived from monoalkenylaromatic and/or acrylic monomers alone or in combination with other vinyl monomers. Other impact modifiers include the above-described types containing units having polar groups or active functional groups, as well as miscellaneous polymers such as Thiokol rubber, polysulfide rubber, polyurethane rubber, polyether rubber (e.g., polypropylene oxide), epichlorohydrin rubber, ethylene-propylene rubber, thermoplastic polyester elastomers, thermoplastic ether-ester elastomers, and the like, as well as mixtures comprising any one of the foregoing. A suitable impact modifier amongst the ionomer resins is SURLYN® available from Du Pont.

When multiple layers are used in the organic coating, the impact modifiers may be used in any of the layers. It is generally desirable to use the impact modifiers in the layer that is disposed upon the substrate. Impact modifiers may be used in amounts greater than or equal to about 0.5, preferably greater than or equal to about 1.0, more preferably greater than or equal to about 1.5 wt % based upon the total weight of the organic coating. In general it is desirable to have the impact modifier present in an amount of less than or equal to about 20, preferably less than or equal to about 15, more preferably less than or equal to about 10 wt % of the total weight of the organic coating.

In one embodiment, the organic coating can contain foaming agents. The foaming agents can be used to foam the organic coating prior to curing. It is generally desirable for the foaming agent to undergo expansion prior to the curing of the organic coating. The foaming agents can be physical blowing agents or chemically decomposing blowing agents. Examples of suitable physical foaming agents can be chlorofluorocarbons, liquid or gaseous carbon dioxide, halogen derivatives of methane and ethane, such as methyl fluoride, methyl chloride, difluoromethane, methylene chloride, perfluoromethane, or the like; hydrocarbons such as acetylene, ammonia, butane, butene, isobutane, isobutylene, propane, dimethylpropane, ethane, methane, trimethylamine, pentane, cyclopentane, hexane, propane, propylene, alcohols, ethers, ketones; or the like, or a combination comprising at least one of the foregoing agents. Useful physical foaming agents have a boiling point between about −50° C. and about 100° C., and preferably between about −50° C. and about 50° C. Physical foaming agents may be used in gaseous and/or liquid state.

Solid, chemically decomposable foaming agents, which decompose at elevated temperatures to form gases, may also be used. Examples of suitable chemical foaming agents include azodicarbonamide, p-toluene sulfonyl hydrazide, p-toluene sulfonyl semicarbazide, 5-phenyltetrazole, ethyl-5-phenyltetrazole, or the like, or a combination comprising at least one of the foregoing chemically decomposable foaming agents.

In one embodiment, a thermally expandable microsphere can be used as the foaming agent. The microsphere is formed of a gas proof polymeric shell (e.g., polyacrylonitrile or polyvinylidene chloride) that encapsulates a (cyclo)aliphatic hydrocarbon (e.g. liquid isobutene). When the thermally expandable microspheres are subjected to temperatures of about 50° C. to about 200° C., the polymeric shell softens and the (cyclo)aliphatic hydrocarbon expands, thereby promoting an increase in the volume of the microspheres. When expanded, the microspheres have a diameter 3.5 to 4 times their original diameter, as a consequence of which their expanded volume is about 50 to 60 times greater than their initial volume in the unexpanded state. An example of such thermally expandable microspheres are the EXPANCEL® DU microspheres which are marketed by AKZO Nobel Industries of Sweden.

In one embodiment, the microspheres are unexpanded or partially unexpanded microspheres consisting of small spherical particles with an average diameter of typically 10 to 15 micron. The microspheres are incorporated into the organic coating and are expanded prior to curing. Both the expansion and the curing can be conducted outside the subterranean fracture or after being introduced into the subterranean fracture.

When multiple layers are used in the organic coating, the foaming agent may be used in any of the layers. It is generally desirable to use the foaming agent in the layer that is disposed upon the substrate. Foaming agents may be used in amounts greater than or equal to about 0.5, preferably greater than or equal to about 1.0, more preferably greater than or equal to about 1.5 wt % based upon the total weight of the organic coating. In general it is desirable to have the foaming agent present in an amount of less than or equal to about 20, preferably less than or equal to about 15, more preferably less than or equal to about 10 wt % of the total weight of the organic coating.

In general the organic coating is present in an amount of about 2 to about 50 wt %, based on the total weight of the coated particle. In one embodiment, the organic coating is present in an amount of about 4 to about 30 wt %, based on the total weight of the coated particle. In another embodiment, the organic coating is present in an amount of about 5 to about 20 wt %, based on the total weight of the coated particle. An exemplary amount of coating is 21 wt %, based on the weight of the coated particle.

In one embodiment, as shown in the FIG. 3, the coated particle can comprise an organic material into which is dispersed a filler (i.e., a composite material). The organic material can be a thermosetting or a thermoplastic polymer. The fillers can be organic or inorganic. The fillers can have average particle sizes of about 2 to about 30 micrometers. Examples of suitable thermosetting and thermoplastic polymers are listed above as are examples of fillers. The organic material used in the coating may be the same as that used in the core of the coated particle, or alternatively it may be different. The organic material used in the coating may optionally contain fillers.

When the coated particle comprises an organic coating with a filler dispersed through it as shown in the FIG. 3, the amount of the organic coating is about 5 to about 50 wt %, based upon the total weight of the coated particle. In one embodiment, the amount of the organic coating is about 10 to about 40 wt %, while in another embodiment, the organic coating is about 15 to about 35 wt %, based upon the total weight of the coated particle.

The coated particle has an average particle size of about 200 to about 2,000 micrometers (about 70 mesh to about 10 mesh). In one embodiment, the coated particle has an average particle size of about 300 to about 1,000 micrometers. In another embodiment, the coated particle has an average particle size of about 350 to about 650 micrometers. The coated particles can have a bimodal or higher distributions.

As noted above, the coated particle has an apparent density of about 1 to about 4 grams per cubic centimeter (g/cc). It is desirable to tailor the density of the coated particles to match the density of the rock through which the subterranean fracture is being created. This can be achieved by tailoring the density of the coated particles to a desirable value. In one embodiment, the coated particle has an apparent density of about 1.1 to about 3 g/cc. In another embodiment, the coated particle has an apparent density of about 1.15 to about 2 g/cc. An exemplary apparent density for the coated particle is about 1.8 g/cc. Density can be varied by either altering the density of the cores or by altering the choice of filler or doing both.

In one manner of manufacturing the coated particles, the substrate is first heated to a desirable temperature. In general, when the substrate comprises inorganic material, it is desirable to heat the substrate prior to mixing with thermoplastic polymer, thermosetting polymer and/or a thermosetting polymer precursor that forms the organic coating. An exemplary temperature is greater than or equal to about 100° C,. In one embodiment, the temperature is greater than or equal to about 120° C. In another embodiment, the temperature is greater than or equal to about 180° C. In yet another embodiment, the temperature is greater than or equal to about 220° C. After heating the substrate to a desirable temperature, a thermoplastic polymer or a thermosetting polymer is then disposed upon the substrate. The thermoplastic polymer, thermosetting polymer and/or a thermosetting polymer precursor that forms the organic coating upon the substrate may be applied to the substrate by blending in the melt or in a solution. Following the formation of a suitable coating upon the substrate, crosslinking takes place in the thermosetting polymers to form the coated particle. As noted above, the crosslinking can take place in an oven or similar device prior to fracturing or alternatively crosslinking can take place after the coated particle is deposited in the fracture.

The substrates along with the desired polymers are first taken in a mixing device and mixed to form a suitable mixture. In one embodiment, when blending occurs in the melt (melt blending), the thermoplastic polymer, the thermosetting polymer or the thermosetting polymer precursor is melted in the presence of the heated inorganic substrates. The thermoplastic polymer, the thermosetting polymer or the thermosetting polymer precursor begins to flow when contacted with the heated substrates. If desired, the mixing may be conducted at an elevated temperature of greater than or equal to about 100° C., in heating devices such as ovens, furnaces, or the like. Upon mixing the substrates with the thermoplastic polymer, the thermosetting polymer or the thermosetting polymer precursor, an organic coating is disposed upon the inorganic substrate. The mixing can take place in a device that uses shear force, extensional force, compressive force, ultrasonic energy, electromagnetic energy, thermal energy or a combination comprising at least one of the foregoing forces and energies and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, screen packs, rolls, rams, helical rotors, or a combination comprising at least one of the foregoing. Exemplary mixing devices are extruders such as single screw and twin screw extruders, buss kneaders, helicones, Eirich mixer, Waring blenders, Henschel mixers, or the like.

The mixing results in the organic coating being disposed upon the substrate. During the process of mixing, the organic coating can be crosslinked. The crosslinking can be complete or partial. If partial crosslinking occurs during the mixing process, an additional annealing step may be conducted to complete the crosslinking.

In another method of manufacturing the coated particles, the heated substrates are contacted with the thermoplastic polymer, the thermosetting polymer or the thermosetting polymer precursor that is pre-mixed with a suitable solvent. This solvent blending process is generally used when ease of mixing between the polymer and the substrate is desired. Thermoplastic polymers, thermosetting polymers or the thermosetting polymer precursors that have to be heated to high temperatures in order to melt them can be first dissolved in a solvent at a temperature lower than the melting temperature and then disposed upon the substrates.

In yet another embodiment, the thermoplastic polymer, the thermosetting polymer or the thermosetting polymer precursor are liquids at room temperature. In this event, the substrates are not preheated prior to being mixed with the thermoplastic polymer, the thermosetting polymer or the thermosetting polymer precursor. Upon mixing, the thermoplastic polymer, the thermosetting polymer or the thermosetting polymer precursor is disposed upon the substrates to form an organic coating. The particles, thus coated, can then be subjected to processes that facilitate partial or complete curing of the organic coating.

In one exemplary manner of manufacturing the coated particles, a mixture comprising the substrate, the thermoplastic polymer, the thermosetting polymer or the thermosetting polymer precursor that will be used for the organic coating and any optional fillers are introduced into a mixer such as an Eirich mixer. A dusting additive may be added to minimize the creation of dust. The mixing is first carried out at a first speed for a given time. Following this the mixing speed is changed. The change in the speed of mixing promotes the formation of a layer of the organic coating around the substrate. When the particles are of the desired size (i.e., about 200 to about 800 micrometers, the curing (crosslinking) cycle is begun in either a rotary kiln, a rotary drier or a fluidized bed. If desired, a catalyst can be added to the mixture to increase the rate of cure (crosslinking). In order to obtain a desired density for the coated particles, process parameters can be varied. For example, the amount of filler or the amount of organic material can be increased to change the density of the coated particles.

In one embodiment, when the batch size is about 200 kilograms, a desirable temperature for the curing process is about 80 to about 250° C. The time for the curing process may vary depending upon the temperature employed. At temperatures near about 250° C., the time for curing can be about 15 minutes, while at temperatures near about 80° C. the time for curing can be about 10 hours. In one embodiment, a suitable time for curing can be greater than or equal to about 1 hour, while in another embodiment, a suitable time for curing can be greater than or equal to about 2 hours.

It is desirable for the coated particles to have a bulk density of about 0.75 to about 0.95 g/cm$^3$. In one embodiment, the coated particles have a bulk density of about 0.8 to about 0.9 g/cm$^3$. It is also desirable for the coated particles to have an apparent density of about 1.6 to about 1.85 g/cm$^3$ as determined by API RP 58 with isobutanol. In one embodiment, the coated particles have a bulk density of about 1.70 to about 1.80 g/cm$^3$. The coated particles generally have a turbidity of less than or equal to about 250 as measured according to API RP 56.

It is generally desirable for the coated particle to have a solubility in an acid of less than or equal to about 6 wt %. In one embodiment, the coated particle has an acid solubility of less that or equal to about 4 wt %. In another embodiment, the coated particle has an acid solubility of less than or equal to about 3 wt %.

It is desirable for the coated particle to have a roundness of about 0.7 to about 0.9. An exemplary roundness is about 0.8. It is also desirable for the coated particle to have a sphericity of about 0.7 to about 0.9 as measured were measured according to API RP 58 (American Petroleum Industry Recommended Procedure 58).

In one embodiment, when used in a fracturing fluid, it is desirable for the coated particles to have a crush test percentage of less than 6%, when the crush resistance test was conducted at a pressure of 2000 lbs per square inch (psi) according to API RP 60. In another embodiment, the coated particles have a crush test percentage of less than 4%. In yet another embodiment, the coated particles have a crush test percentage of less than 3%.

In general it is desirable for the coated particles to resist deformation when subjected to compressive pressures. The compressive pressures can be greater than 4000 pounds per square inch (psi). It is desirable for the coated particle to undergo a deformation in any given direction of less than or equal to about 50%, when compared with the original dimensions in that direction. In one embodiment, the coated particle can undergo a deformation in any given direction of less than or equal to about 20%, when compared with the original dimensions in that direction. In another embodiment, the coated particle can undergo a deformation in any given direction of less than or equal to about 10%, when compared with the original dimensions in that direction. In yet another embodiment, the coated particle can undergo a deformation in any given direction of less than or equal to about 5%, when compared with the original dimensions in that direction.

It is also desirable that no fines be generated when the coated particle is subjected to a high compressive pressure of greater than or equal to about 4000 psi, when introduced into the fracture. In one embodiment, it is desirable for the coated particle to generate less than 20 wt % in fines, based on the total weight of the coated particle when subjected to a pressure of greater than or equal to about 4000 psi. In another embodiment, it is desirable for the coated particle to generate less than 10 wt % in fines, based on the total weight of the coated particle when subjected to a pressure of greater than or equal to about 4000 psi. In yet another embodiment, it is desirable for the coated particle to generate less than 5 wt % in fines, based on the total weight of the coated particle when subjected to a pressure of greater than or equal to about 4000 psi. The coated particle can also advantageously be used as a drilling bead if desired.

In one embodiment, the coated particle displays an average deformation of less than or equal to about 30% when subjected to a compressive force of 2,000 psi. In another embodiment, the coated particle displays an average deformation of less than or equal to about 25%, when subjected to a compressive force of 2,000 psi. In yet another embodiment, the coated particle displays an average deformation of less than or equal to about 20%, when subjected to a compressive force of 2,000 psi.

In another embodiment, the coated particle displays an average relaxation of less than or equal to about 30% when subjected to a compressive force of 2,000 psi. In another embodiment, the coated particle displays an average relaxation of less than or equal to about 25%, when subjected to a compressive force of 2,000 psi. In yet another embodiment, the coated particle displays an average relaxation of less than or equal to about 20%, when subjected to a compressive force of 2,000 psi.

As noted above, the coated particles can be used as a proppant in fracturing fluids and in gravel packs. In one embodiment, a method of treating a subterranean formation comprises injecting a fracturing fluid composition into a subterranean formation, wherein the fracturing fluid comprises coated particles having inorganic substrates that comprise a silica to alumina ratio of about 2.2 to about 5. The use of the coated particle as a proppant advantageously results in the generation of a lesser quantity of fines as compared with other commercially available proppants. Another advantage is the density of the coated or uncoated particles, which enhances proppant transport or gravel pack placement. Since the coated and uncoated particles have an apparent that is less than or equal to about 2 g/cm$^3$, these particles can be carried further at a given pump rate or be placed into the subterranean fracture using a lower pumping rate (than is possible when using conventional density proppant/gravel pack media).

In another embodiment, related to the use of the inorganic substrates that comprise a silica to alumina ratio of about 2.2 to about 5 and a bulk density of less than or equal to about 1 g/cm$^3$, the inorganic substrate itself can be used as a proppant or in a gravel pack. The inorganic substrate without any organic coating can be disposed in a fracturing fluid and can be used to fracture the subterranean formation.

In another embodiment, the coated particles can be used in a gravel packing operation. In gravel packing operations, the coated particles can be suspended in a carrier fluid are pumped into a well bore in which the gravel pack is to be placed. The carrier fluid leaks off into the subterranean zone and/or is returned to the surface while the coated particles are left in the subterranean zone. The resultant gravel pack acts as a filter to separate formation sands from produced fluids while permitting the produced oil and/or gas to flow into the well bore. A method of forming a gravel pack therefore comprises suspending the coated particles in a carrier fluid to form a suspension; wherein the coated particles comprise inorganic substrate that comprise silica and alumina in a silica to alumina weight ratio of about 2.2 to about 5; and wherein the inorganic substrate has a bulk density of less than or equal to about 1 g/cm$^3$; pumping the suspension into a well bore; and draining the carrier fluid to form a gravel pack.

The following examples, which are meant to be exemplary, not limiting, illustrate compositions and methods of manufacturing of some of the various embodiments of the coated particles described herein.

EXAMPLES

The following examples serve to illustrate the present invention. Unless otherwise indicated all parts and percentages are by weight, and all screen mesh sizes are U.S. Standard Screen sizes.

Example 1

This experiment was conducted to determine the properties of a coated particle having a porous, inorganic substrate whose bulk density is 0.75 g/cm$^3$ and whose silica to alumina ratio is between 3 and 4. The porous, inorganic substrate used in the coated particle was obtained from HGR Inc. in Weimar, Germany and had a bulk density of 0.75 g/cm$^3$ and an apparent density of 1.54 g/cm$^3$. The apparent density was measured according to API RP 58, but with isobutanol. The acid solubility measured according to API RP 58 was 11.2 wt %. A crush test conducted at 2000 psi revealed the percent fines to be about 20%. The roundness and sphericity for the porous, inorganic substrate were 0.6 and 0.6 respectively. The chemical composition of the substrate is shown under the exemplary amount in Table 1 above.

The porous inorganic substrates were then mixed with a resole phenolic-formaldehyde resin and a silica flour to form a coating on the substrate. The resole phenolic-formaldehyde resin contained 65 wt % solids. The resole phenolic-formaldehyde resin generally has a viscosity of about 100 to about 500 centipoise at room temperature. The silica flour used as the filler in the resole phenolic-formaldehyde resin coating was SIKRON® SF 242 commercially available from Quarzwerke GmbH, Frechen, Germany. The average particle size for the silica flour was 5 micrometers. The coated particle has a composition shown in the Table 2.

TABLE 2

| Inorganic substrate (wt %) | Resole phenolic-formaldehyde resin (wt %) | Quartz flour (wt %) |
|---|---|---|
| 47.9 | 21 | 31 |

The manufacturing of the coated particles was conducted in an Eirich mixer, type RV02E having a capacity of 10 kilograms (kg). The mixing was conducted as shown in the Table 3 below. The mixing was conducted entirely at room temperature.

TABLE 3

| Step | Action | RPM | Time (seconds) | Amount added (Kilograms) |
|---|---|---|---|---|
| 1 | Add inorganic substrate | 200 | 10 | 98 |
| 2 | Add resin | 500 | 30 | 25 |
| 3 | Mixing | 800 | 40 | — |
| 4 | Add filler | 800 | 10 | 75 |
| 5 | Mixing | 800 | 30 | — |
| 6 | Add resin | 800 | 10 | 5.5 |
| 7 | Mixing | 800 | 30 | — |
| 8 | Mixing | 400 | 60 | — |
| 9 | Discharge | 200 | 10 | — |

The particles were then subjected to crosslinking by heating them in a gas fired kiln. The gas fired kiln has multiple zones for curing the organic coating disposed upon the substrate. The first zone that the coated particles were introduced into was set at a temperature of about 280° C., while the last zone in the kiln was set at a temperature of aboput 180° C. The rate of travel of the coated particles through the zones of the kiln depend upon the rate at which product is produced. Samples were periodically removed from the kiln and examined for completeness of curing. The total time of residence in the kiln therefore varied between 40 minutes and 90 minutes. The measured properties of the coated particle are shown in the Table 4.

TABLE 4

| Properties | Measured Value |
|---|---|
| Bulk Density (g/cm$^3$) | 0.87 |
| Crush test at 2,000 psi (wt %) | 1.97 |
| Apparent density (g/cm$^3$) | 1.80 |
| Acid solubility | 3.94 |
| Roundness/Sphericity | 0.7/0.7 |
| Turbidity | 158 |

Example 2

This example was conducted to demonstrate the properties of a coated having a porous inorganic substrate upon which is disposed a coating having an filler. In general, inorganic fillers have higher bulk and apparent densities than fillers. Thus coated particles having inorganic substrates are generally heavier than coated particles having organic substrates. This increased density makes it harder for the proppant to be transported to the entire length of the fracture. However, this example demonstrates that if the bulk density of the inorganic particle is reduced below 1 g/cm$^3$, preferably less than 0.8 g/cm$^3$, then the coated particle comprising the inorganic substrate performs as well as a coated particle having an organic substrate. In this example, a sample having the porous inorganic substrate is compared against a sample having a naturally occurring organic substrate. Both substrates have an organic coating comprising a naturally occurring filler disposed thereon.

The porous inorganic substrate used in the coated particle was obtained from HGR Inc. in Weimar, Germany and had a bulk density of 0.75 g/cm$^3$ and an apparent density of 1.54 g/cm³. The apparent density was measured according to API RP 58, but with isobutanol. The acid solubility measured according to API RP 58 was 11.2 wt %. A crush test conducted at 2000 psi revealed the percent fines to be about 20%. The roundness and sphericity for the inorganic substrate were 0.6 and 0.6 respectively. The chemical composition of the substrate is shown under the exemplary amount in Table 1 above.

The organic substrate was derived from olive hull. The olive substrate has a 25/52 mesh size and has a particle density of 1.43 g/cm³. The organic filler used in the comparative sample was also obtained from olive hull.

The substrates were then mixed with a resole phenolic-formaldehyde resin and a silica flour to form a coating on the substrate. The resole phenolic-formaldehyde resin contained 65 wt % solids. As indicated in the Table 5, silica flour used as the filler in the resole phenolic-formaldehyde coating was SIKRON® SF 242 commercially available from Quarzwerke GmbH, Frechen, Germany. The average particle size for the silica flour was 5 micrometers. As can be seen in the Table 5, the coated particle having the organic substrate also had organic filler added to its organic coating. The coated particle having the inorganic substrate had only inorganic filler added to its organic coating. Thus, while the coated particle described herein contains only inorganic fillers and an inorganic substrate, the comparative sample contains an organic substrate and organic and inorganic fillers.

As can be seen in the Table 5 below, a range of weights were used for the substrate, the organic coating and the filler. The experiments were performed in the form of a design of experiments (DOE) and the average results along with standard deviations are tabulated in the Table 6. At least 4 samples were tested for each result. Tests that were performed were percent crush in wt % at 2,000 pounds per square inch (psi) and 6,000 psi as per API RP 60, apparent density in g/cm³ as per API RP 58, acid solubility in wt % as per API RP 58, deformation and percentage relaxation at 2000 psi and 6000 psi.

TABLE 5

| | Substrate (wt %) | Organic coating (wt %) | Filler (wt %) | Filler (wt %) |
|---|---|---|---|---|
| Coated Particle | Inorganic (44-59 wt %) | resole phenolic-formaldehyde resin (11-22 wt %) | Silica flour (27-42 wt %) | — |
| Comparative Sample | Olive Hull (39-58 wt %) | resole phenolic-formaldehyde resin (14-26 wt %) | Silica flour (16-20 wt %) | Crushed olive hull (14-20 wt %) |

The samples were prepared as shown in the Table 3 above in Example 1 except for the respective amounts of the substrate, resin and filler, which are as shown in the Table 5 above. The particles were subjected to curing as detailed in Example 1.

TABLE 6

| Property | Coated Particle | Comparative Sample |
|---|---|---|
| Crush at 2,000 psi (wt %) Average/(standard deviation) | 4.3 (2.16) | 1.0 (1.12) |
| Crush at 6,000 psi (wt %) Average/(standard deviation) | 21.3 (2.80) | 7.2 (2.5) |
| Apparent density (g/cm³) Average/(standard deviation) | 1.85 (0.12) | 1.63 (0.06) |
| Acid solubility (wt %) Average/(standard deviation) | 3.4 (0.70) | 2.9 (1.7) |
| 2,000 psi deformation/relaxation (%) Average/(standard deviation) | 24/23 (5.8/8.5) | 26/30 (5.7/7.0) |
| 6,000 psi deformation/relaxation (%) Average/(standard deviation) | 53/9 (3.2/1.1) | 53/16 (7.2/6.2) |

From Table 6, it may be seen that coated particle comprising an inorganic substrate and inorganic fillers performs very well against the comparative sample. For example, in the deformation/relaxation test at 2,000 psi, the percent deformation for the coated particles is less than that of the comparative samples. Similarly, the coated particles show low acid solubility and have a low apparent density.

From the data shown in the Example 2, it can be seen that when an inorganic substrate having a bulk density of less than or equal to about 1 g/cm³ is used in a coated particle, the coated particle performs suitably when compared with particles that contain primarily lighter weight organic fillers. Thus coated particles having a porous inorganic substrate can be advantageously as proppants, in gravel packs, or as drilling beads.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A coated particle comprising:
   an inorganic material substrate, wherein the inorganic material substrate comprises silica and alumina in a silica to alumina weight ratio of about 2.2 to about 5; and wherein the inorganic material substrate has a bulk density of less than or equal to about 1 g/cm³; and
   a coating disposed upon the inorganic material substrate, wherein the coating particle has an apparent density of about 1 to about 2 g/cm³, a bulk density of less than or equal to about 1.0 g/cm³, an acid solubility of less than or equal to about 6 wt %, a roundness of about 0.7 to about 0.9, a sphericity of about 0.7 to about 0.9, and a crush test percentage of less or equal to about 6% at 2,000 pounds per square inch.

2. The coated particle of claim 1, wherein the inorganic material substrate has a bulk density of less than or equal to about 0.8 g/cm³ and a silica to alumina weight ratio of about 3 to about 4.

3. The coated particle of claim 1, wherein the inorganic material substrate has an apparent density of about 1.3 to about 2.0 g/cm³.

4. The coated particle of claim 1, wherein the inorganic material substrate further comprises ferric oxide and wherein a weight ratio of silica to ferric oxide is about 6.8 to about 13 and wherein a weight ratio of alumina to ferric oxide is about 2 to about 5.

5. The coated particle of claim 1, wherein the inorganic material substrate has a porosity of greater than or equal to about 5%, based on the total volume of the substrate.

6. The coated particle of claim 1, wherein the inorganic material substrate is present in an amount of 35 to 65 wt %, based on the total weight of the coated particle.

7. The coated particle of claim 1, wherein the coating comprises an organic coating.

8. The coated particle of claim 1, wherein the coating comprises a thermosetting polymer.

9. The coated particle of claim 1, wherein the coating comprises epoxies, acrylate resins, methacrylate resins, phenol-formaldehydes, epoxy-modified novolacs, furans, urea-aldehydes, melamine-aldehydes, polyester resins, alkyd resins, phenol formaldehyde novolacs, phenol formaldehyde resoles, phenol-aldehydes, resole and novolac resins, epoxy modified phenolics, polyacetals, polysiloxanes, polyurethanes, or a combination comprising at least one of the foregoing thermosetting polymers.

10. The coated particle of claim 1, wherein the coating comprises a resole phenolic-formaldehyde resin.

11. The coated particle of claim 1, wherein the coating comprises 1, 2, 3 or 4 layers.

12. The coated particle of claim 1, wherein the coating comprises fillers.

13. The coated particle of claim 12, wherein the fillers are naturally occurring organic fillers.

14. The coated particle of claim 13, wherein the naturally occurring organic fillers comprise ground or crushed nut shells, ground or crushed seed shells, ground or crushed fruit pits, processed wood, ground or crushed animal bones, or a combination comprising at least one of the naturally occurring fillers.

15. The coated particle of claim 13, wherein the naturally occurring organic fillers comprise crushed or ground walnut, crushed or ground pecan, crushed or ground almond, crushed or ground ivory nut, crushed or ground brazil nut, or a combination comprising at least one of the foregoing nuts.

16. The coated particle of claim 13, wherein the naturally occurring organic fillers comprise crushed and ground seeds of plum, crushed and ground seeds of peach, crushed and ground seeds of cherry, crushed or ground olive hulls, crushed and ground seeds of apricot, ground or crushed seed shells maize, processed wood materials from oak, hickory, walnut, poplar and mahogany trees that have been processed by grinding or chipping.

17. The coated particle of claim 13, wherein the fillers further comprise inorganic fillers.

18. The coated particle of claim 12, wherein the fillers comprise an inorganic filler.

19. The coated particle of claim 1, having a bulk density of less than or equal to about 1.0 g/cm$^3$ and an average relaxation of less than or equal to about 30% when subjected to a compressive force of 2,000 psi.

20. A proppant comprising the coated particle of claim 1.

21. A gravel pack comprising the coated particle of claim 1.

22. A coated particle comprising:
an inorganic substrate; and
an organic coating disposed thereon; wherein the coated particle has an apparent density of about 1 to about 2 g/cm$^3$ and a bulk density of less than or equal to about 1.0 g/cm$^3$, wherein the inorganic substrate has an acid solubility of less than or equal to about 6 wt %, a roundness of about 0.7 to about 0.9, a sphericity of about 0.7 to about 0.9, and a crush test percentage of less or equal to about 6% at 2,000 pounds per square inch when the crush test is conducted as per API RP 60.

23. The coated particle of claim 22, wherein the coated particle displays a relaxation of less than or equal to about 24% when subjected to a pressure of 2,000 pounds per square inch.

24. The coated particle of claim 22, wherein the inorganic substrate comprises inorganic oxides, and wherein the inorganic oxides are silica ($SiO_2$), alumina ($Al_2O_3$), titanium dioxide ($TiO_2$), ferric oxide ($Fe_2O_3$), calcium oxide (CaO), magnesium oxide (MgO), potassium dioxide ($K_2O$), sodium oxide ($Na_2O$), or a combination comprising at least one of the foregoing inorganic oxides.

25. The coated particle of claim 22, wherein the inorganic substrate comprises silica ($SiO_2$), alumina ($Al_2O_3$), and ferric oxide ($Fe_2O_3$), and wherein the ratio of silica to alumina is about 2.2 to about 5.

26. The coated particle of claim 22, wherein the inorganic substrate has a bulk density of about 0.6 to about 1.0 g/cm$^3$ and an apparent density of about 1.3 to about 2.0 g/cm$^3$.

27. A proppant comprising the coated particle of claim 22.

28. A gravel pack comprising the coated particle of claim 22.

* * * * *